United States Patent [19]

Trahan

[11] Patent Number: 4,672,440
[45] Date of Patent: Jun. 9, 1987

[54] SCRAMBLED SIGNAL DETECTOR

[75] Inventor: Charles R. Trahan, Quakertown, Pa.

[73] Assignee: General Instrument Corporation, New York, N.Y.

[21] Appl. No.: 503,210

[22] Filed: Jun. 10, 1983

[51] Int. Cl.[4] .................. H04N 7/67; H04N 7/16; H04K 1/00

[52] U.S. Cl. .................................. 380/15; 380/20

[58] Field of Search ............... 358/120, 122, 119, 123, 358/117; 307/518, 264

[56] References Cited

U.S. PATENT DOCUMENTS

| 3,530,232 | 9/1970 | Reiter et al. | 358/120 |
| 4,095,258 | 6/1978 | Sperber | 358/120 |
| 4,145,717 | 6/1979 | Guif et al. | 358/120 |
| 4,511,919 | 4/1985 | Forgey et al. | 358/117 |

Primary Examiner—S. C. Buczinski
Assistant Examiner—Melissa Koltak
Attorney, Agent, or Firm—Allan J. Jacobson

[57] ABSTRACT

A television converter includes a circuit for detecting scrambled signals and enabling the descrambler in response thereto. Scrambled signals are detected by sensing amplitude modulated digital tag information on the audio carrier. The descrambler is enabled if amplitude modulation is detected on the audio carrier during the portion of a horizontal line where digital information is expected, and also if no amplitude modulation is detected during a portion of the horizontal line where no data is expected. The scrambled signal detector of the present invention reduces the tendency for noise and other influences to enable the scrambler when viewing a clear, i.e. unscrambled, signal.

5 Claims, 3 Drawing Figures

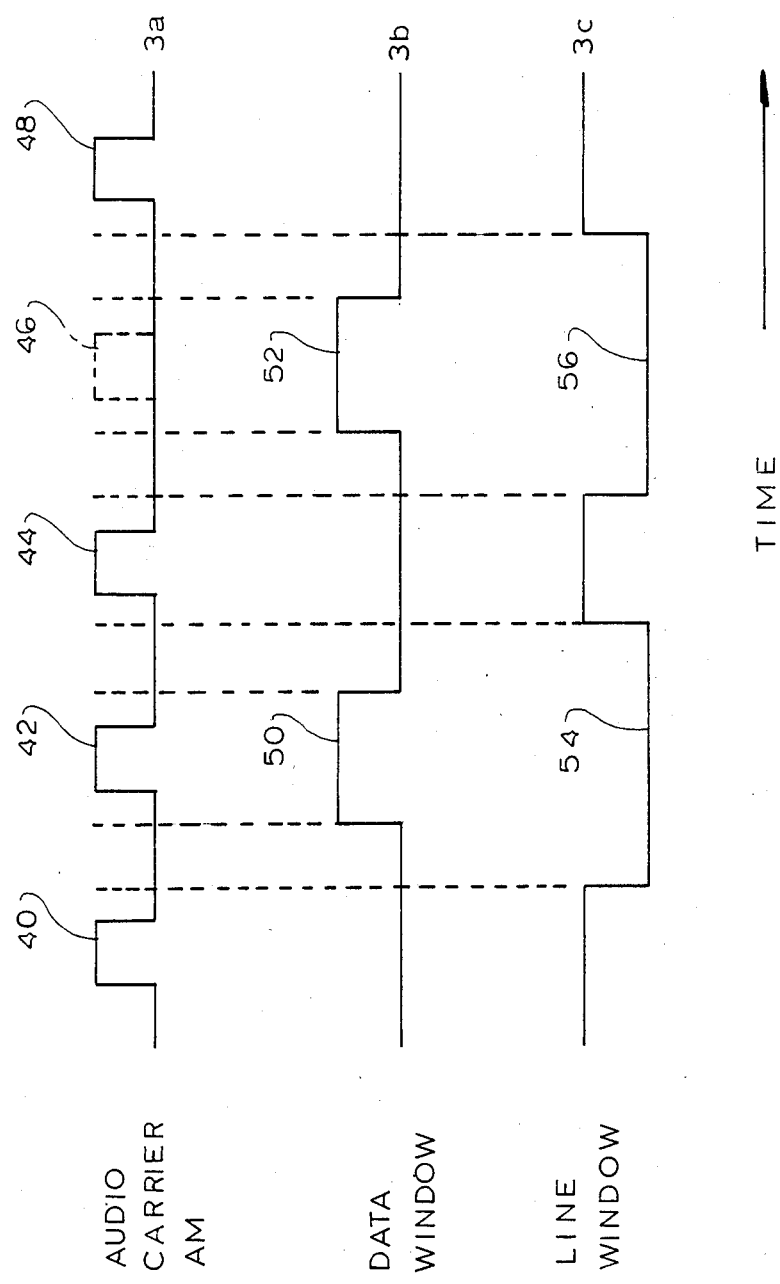

SCRAMBLED SIGNAL DETECTOR

FIELD OF THE INVENTION

This invention relates to television converters for use with scrambled signals.

BACKGROUND OF THE INVENTION

A system for distributing pay television signals is described in a patent application entitled "Protected Television Signal Distribution System", Ser. No. 215,044, filed Dec. 10, 1980, assigned to the assignee of the present invention.

Briefly, in the above cited patent application, television signals are scrambled by suppressing the amplitude of horizontal and vertical synchronizing pulses so that the signal is not viewable on an ordinary television receiver. The timing information necessary to restore the horizontal and vertical synchronizing pulses is provided as amplitude modulation (AM) on the audio carrier.

Specifically, an AM pulse appears on the audio carrier in timed coincidence with the horizontal sync pulse. The vertical synchronizing interval is indicated by the absence of AM pulses on the audio carrier.

Each transmitted video signal is further identified with a digital tag code that is also amplitude modulated onto the audio carrier. The digital tag code identifies the video program content. Digital tag information is transmitted as follows: After the first horizontal sync pulse following vertical interval, and approximately one third way between two horizontal sync pulses, an AM pulse is provided as a logic one bit which represents the start bit of the digital tag code. Further data bits representing the digital tag information bits (each approximately one third way between consecutive horizontal sync pulses) are transmitted one bit per horizontal line. The presence of an AM pulse indicates a logic 1; the absence of an AM pulse indicates a logic 0.

A scrambled signal is usually detected by detecting the presence of valid digital tag data on a video signal. In the prior art, if tag data is detected and is unchanged for several consecutive fields, then the descrambler is enabled. The descrambler then restores the proper amplitude relationship between the video signal portion and the horizontal and vertical synchronizing pulses. However, there is often some amplitude modulation on the audio carrier due to adjacent channel energy, noise, or when changing channels. Such spurious audio carrier AM sometimes causes the descrambler to be enabled on clear signals, which interfers with normal signal reception.

SUMMARY OF THE INVENTION

The invention is embodied in a scrambled signal detector including means for detecting amplitude modulation of the audio carrier during a portion of the television signal corresponding to the respective bits of the digital tag code, and means for detecting amplitude modulation of the audio carrier during a portion of the television signal which does not correspond to respective bits of the digital tag code.

In accordance with the invention, if amplitude modulation is detected corresponding to the digital tag information, and no amplitude modulation is detected during the portion of the television signal not corresponding to the digital tag information, then an ENABLE signal to the descrambler is generated. Furthermore, if any amplitude modulation is detected during a portion of the television signal not corresponding to respective bits of the digital tag information, then the ENABLE signal to the descrambler is removed.

In accordance with a further aspect of the present invention, a data averager apparatus is provided for coupling, the ENABLE signal to the video descrambler. The data averager output signal to the descrambler changes state only if the respective input signal changes state for a predetermined time interval. For example, in the embodiment shown, the descrambler is enabled after detecting eight consecutive frames of good data, but not disabled until after detection of eight consecutive frames of bad data.

Therefore, the scrambled signal detector of the present invention provides a reliable means for detecting the presence of scrambled television signals.

BRIEF DESCRIPTION OF THE DRAWINGS

FIG. 3 is a graphical representation of various wave forms utilized in the circuit of FIG. 1.

DETAILED DESCRIPTION

Figure 1:
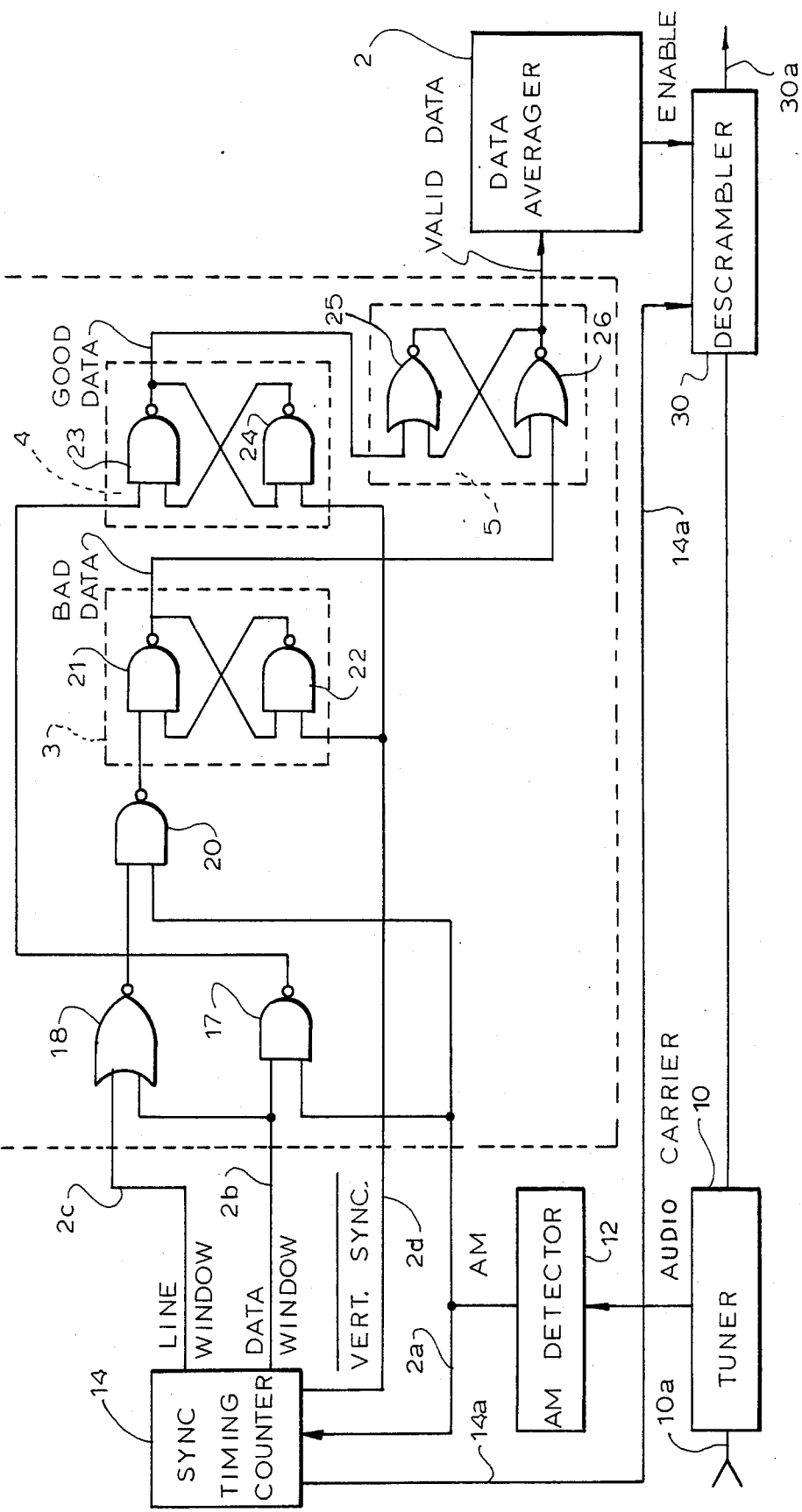
FIG. 1 is a schematic diagram partially in block form of a television converter system embodying the present invention.

A television converter in accordance with the present invention is shown in FIG. 1. The converter is connected to a source of signals such as a cable television medium through conductor 10a to tuner 10. The output of tuner 10 is connected to a descrambler 30 which conditions a scrambled signal so that it may be received by an ordinary television set connected to the output of the descrambler through conductor 30a.

The tuner 10 also provides an audio carrier output to an AM detector 12. The detected AM signal on the audio carrier is connected to the sync timing counter 14. Sync timing counter 14 generates all the necessary timing signals on conductors 2b, 2c, and 2d for the valid/invalid data detector 1, as well as timing information for the descrambler 30 on conductor 14a. The output of the valid/invalid data detector 1 is connected to the input of a data averager 2 which generates the ENABLE signal for descrambler 30.

When a scrambled signal is applied to conductor 10a, then AM detector 12 has an output wave form on conductor 2a. The output signal from the AM detector 12 is illustra;ted in FIG. 3a. Pulse 40 is representative of the first horizontal sync pulse after the vertical interval. Pulses 44, 48, etc. represent following horizontal synchronizing pulses. Pulse 42 which is approximately midway between horizontal sync pulses 40 and 44 represents the start bit of digital tag code. Pulse 46 represents the first data bit of the transmitted digital tag code. The presence of pulse 46 indicates a logical 1; the absence represents a locigal 0.

Sync timing counter 14 generates a DATA WINDOW signal illustrated in FIG. 3b and a LINE WINDOW signal illustrated in FIG. 3c. The DATA WINDOW signal includes window pulses 50 and 52 which frame the data pulses of the digital tag code 42 and 46 respectively. The LINE WINDOW signal include window pulses which frame a portion of the video line between sync pulses as shown for negative going window pulses 54 and 56. The sync timing counter 14 (FIG.

1) further generates timing information, including both horizontal and vertical sync pulse timing, on line 14a which is used by the descrambler 30 to restore the proper amplitude of vertical and horizontal synchronizing intervals.

The valid/invalid detector 1 includes a BAD DATA flip flop 3 comprising cross coupled NAND gates 21 and 22, a GOOD DATA flip flop 4 comprising cross coupled NAND gates 23 and 24, and a VALID DATA flip flop 5 comprising cross coupled NOR gates 25 and 26. Good data is detected by the presence of an AM signal during a data window pulse (50, 52, in FIG. 3) by NAND gate 17. The output of NAND gate 17 is connected to the set input of flip flop 4.

Bad data is detected by the presence of AM anywhere during a horizontal line except during the data window where good data is expected. For the latter purpose, the LINE WINDOW signal on conductor 2C and the DATA WINDOW signal on conductor 2b are connected to NOR gate 18 which provides an output signal to NAND gate 20. The detected AM signal on conductor 2a is also provided as an input to NAND gate 20. The output of NAND gate 20 which represents signals detected on the horizontal line outside of the expected data window is connected to the set input of the flip flop 3. Flip flop 3 and flip flop 4 are reset during the vertical synchronizing interval by a VERTICAL SYNC signal on conductor 2d. Flip flop 5 is set anytime flip flop 4 is set, and is reset anytime flip flop 3 is set. However, bad data is given priority over good data so that if both are present, the output of flip flop 5 is reset, indicating invalid data.

Figure 2:
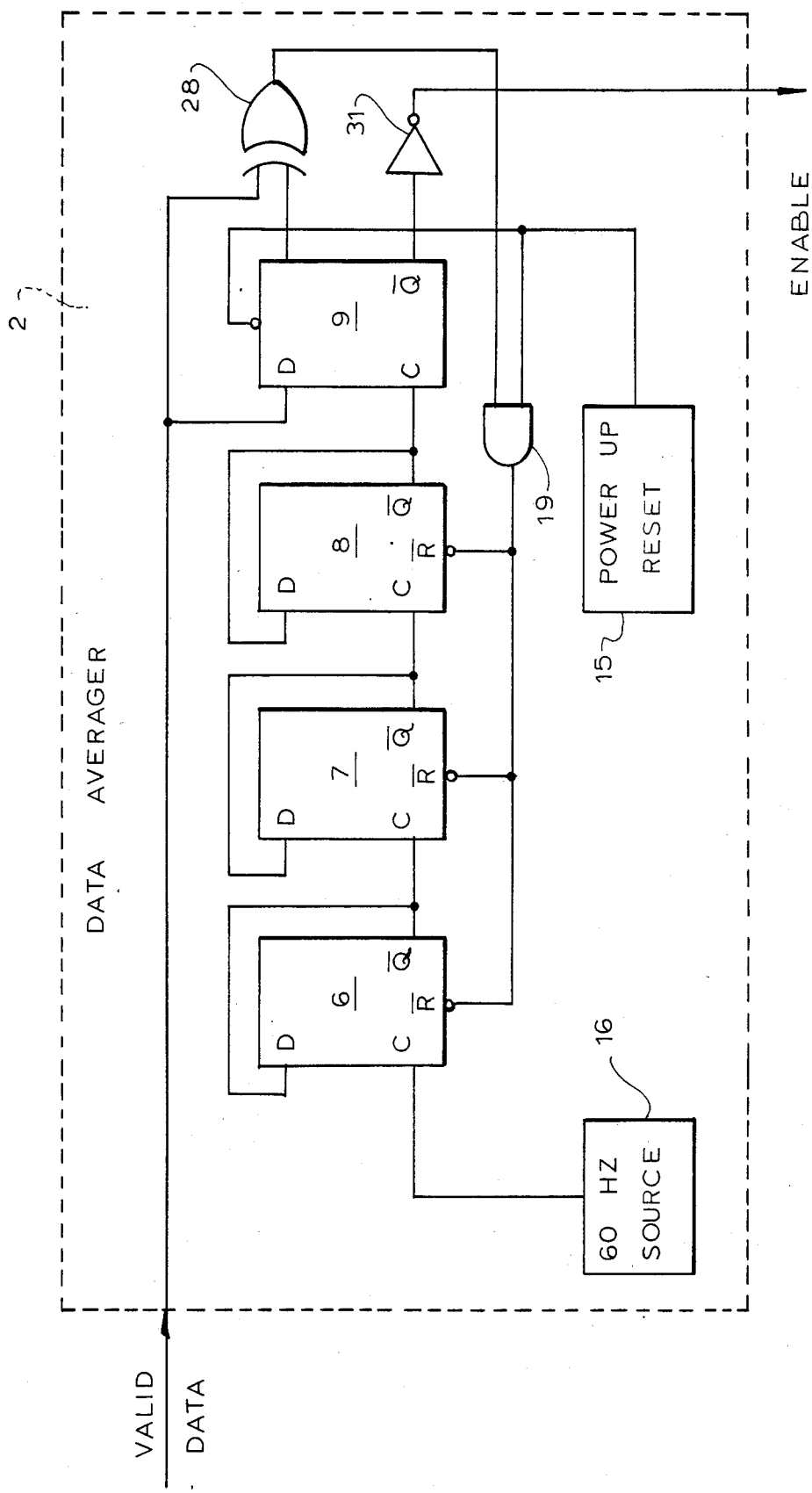
FIG. 2 is a schematic diagram partial in block form of the data averager apparatus shown in FIG. 1.

The output of the VALID DATA flip flop 5 is fed to data averager 2. As shown in FIG. 2, data averager 2 contains a 3 stage ripple counter comprising flip flops 6, 7, and 8 which is driven by the 60 hrz clock source 16. The output of flip flop 8 is connected to the clock input of flip flop 9. The $\overline{Q}$ output of flip flop 9 drives the ENABLE signal through inverter 31. The VALID DATA signal from flip flop 5 is input to the data input terminal of flip flop 9 and also to one input of an exclusive OR gate 28.

Power up reset circuit 15 provides a pulse at the time the circuit is powered up which resets flip flop 6, 7, and 8 and also sets flip flop 9. Flip flop 6, 7 and 8 are also reset through AND gate 19 from exclusive OR 28 or from the power up reset circuit 15. The reset signal to flip flops 5, 6, 7 and 8 from exclusive OR gate 28 is provided when the $\overline{Q}$ output of flip flop 9 and the input of flip flop a (valid data) are different.

The ENABLE output of data averager 2 essentially follows the VALID DATA input. However, the data averager 2 performs the function of averaging the input signal to prevent the output from changing until the VALID DATA input signal has remained stable for approximately 8 consecutive cycles of the 60 hrz clock source 16. For example, assume the VALID DATA signal has been at a logical 1 for a long time. Flip flop 9 is clocked to a logical 1 state, and the ENABLE signal at the output of inverter 31 is at a logical 1. Since the inputs to exclusive OR gate 28 are the same, its output is a logic 0, which keeps flip flop 6, 7, and 8 reset.

When the VALID DATA signal goes to a logic 0, the output of exclusive OR gate 28 goes to a logic 1 which permits flip flop 6, 7, and 8 to begin counting. After a full count of the ripple counter, a clock transistion is provided to flip flop 9 which changes to a reset state. The $\overline{Q}$ output of flip flop 9 is now a logic 0 to exclusive OR gate 28 which provides a logic 0 output signal through AND gate 19 which resets flip flops 6, 7, and 8. Similarly, when the VALID DATA signal changes to a logical 1, flip flop 9 will hold its current state and not switch to a set state until approximately 8 cycles of 60 hrz clock source have elapsed.

In operation, assume that a scrambled signal is provided to the television converter of FIG. 1. The GOOD DATA flip flop 4 will be set upon receiving the start bit of the digital tag code (pulse 42 in FIG. 3a). The BAD DATA flip flop 3 will remain reset. The output of the GOOD DATA flip flop 4 will set the VALID DATA flip flop 5 connected to data averager 2, which in turn will produce an ENABLE signal for the descrambler 30. On the next video field, VERTICAL SYNC signal on conductor 2d will reset flip flops 3 and 4. New digital tag data on the subsequent video field will repeat the above process.

Now assume that there is some noise on the scrambled signal, producing spurious AM on the audio carrier. The noise will produce some bad data outside of the data window timing interval which will set the BAD DATA flip flop 3. If at anytime during a video field the BAD DATA flip flop 3 is reset, then the VALID DATA flip flop 5 will be reset. However, the data averager 2 will not respond immediately to remove the ENABLE signal from the descrambler. Instead, the data must appear invalid for approximately 8 consecutive fields before the descrambler will be disabled.

Now assume that a clear signal is provided to the television converter. Therefore, no AM signal is provided by the AM detector 12 to the sync timing counter 14. The lack of timing information input to sync timing counter 14 means that no timing information will be provided on output 14a to the descrambler 30. Therefore, the descrambler 30 will transmit the signal on output 30a without changing the relative amplitude of the sync pulses to the video signal.

Further assume that the clear video signal has some noise on it which would produce random output from the AM detector 12. Since the noise is randomly distributed, it is very likely that some of this noise will be detected as bad data. It can be seen that the VALID DATA flip flop is set any time good data is detected. However it is also reset any time bad data is detected and remains reset for the duration of one video field. In order to enable the descrambler, good data must be detected where expected and no data detected when not expected for 8 consecutive video fields. Therefore, the present arrangement provides a very low probability that noise will be interpreted as digital tag information to enable the descrambler.

What is claimed is:

1. In a television converter apparatus for receiving a television signal having horizontal and vertical synchronizing portions suppressed relative to the video portion of said television signal, and having digital tag information amplitude modulated onto the audio carrier of said television signal, said converter further including a descrambler means for restoring the amplitude of said horizontal and vertical synchronizing portions relative to said video portion, a scrambled signal detector comprising:

first means for detecting amplitude modulation of said audio carrier during the video portion of said television signal corresponding to respective bits of said digital tag information;

second means for detecting amplitude modulation of said audio carrier during the video portion of said television signal not corresponding to respective bits of said digital tag information; and third means responsive to said first means for enabling said descrambler means, and responsive to said second means for disabling said descrambler means.

2. A scrambled signal detector in accordance with claim 1 wherein said third means comprises:

a first memory element having respective means for setting and resetting said first memory element;

means connected to said means for setting said memory element responsive to amplitude modulation of said audio carrier during a portion of a horizontal line of said television signal corresponding to said start bit of said digital tag information; and means connected to the means for resetting said first memory element and responsive to said television signal for resetting said first memory element once for each respective video field.

3. A scrambled signal detector in accordance with claim 2 wherein said third means further comprises:

a second memory element having respective means for setting and resetting said second memory element; and means connected to said means for setting said second memory element responsive to amplitude modulation of said audio carrier during a portion of a horizontal line of said television signal not corresponding to the start bit of said digital tag information; and means connected to said means for resetting said second memory element and responsive to said television signal for resetting said second memory element for each respective video field.

4. A scrambled signal detector in accordance with claim 3 wherein said third means further comprises:

a third memory element having respective means for setting and resetting said third memory element;

means responsive to said first memory element for setting said third memory element;

means responsive to said second memory element for resetting said third memory element; and means responsive to said third memory element for enabling said descrambler means.

5. A scrambled signal detector in accordance with claim 4 wherein said means connecting said third memory element to said descrambler means comprises:

data averager means responsive to the output of said third memory element for respectively enabling and disabling said descrambler means, said data averager enabling said descrambler if said third memory means is set for a first predetermined time, and disabling said descrambler if said third memory means is reset for a second predetermined time.

* * * * *